July 7, 1970  H. S. HERSHEY, JR  3,519,119
PAN TRANSFER CONVEYOR INTERSECTION
Filed March 5, 1968  3 Sheets-Sheet 1
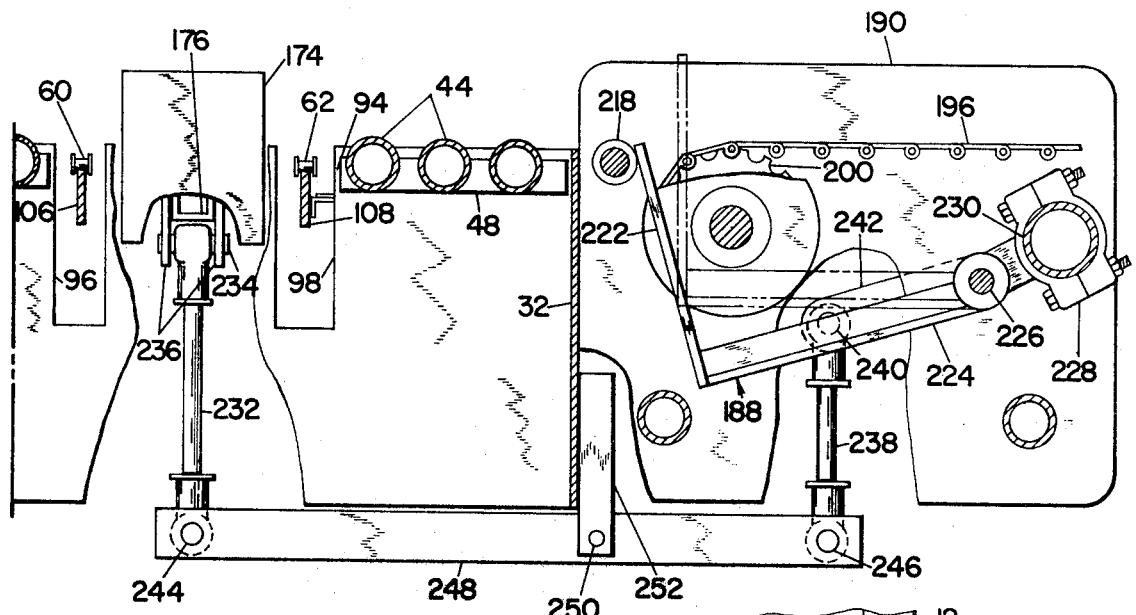
FIG. 4
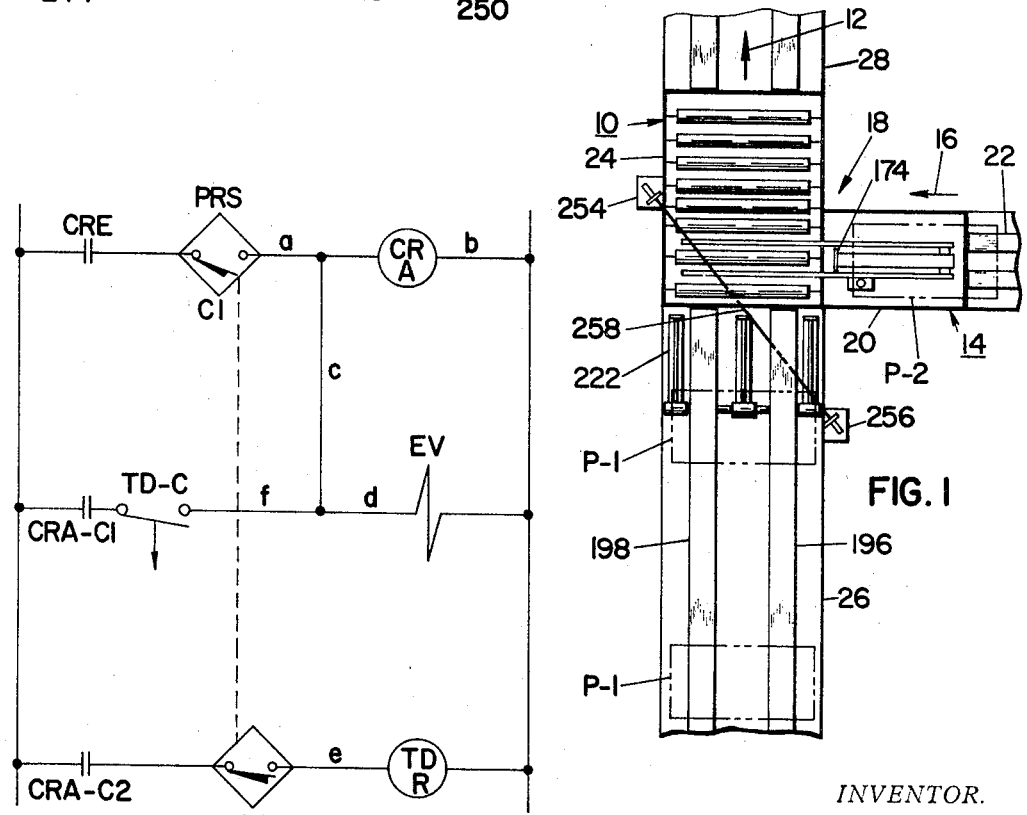
FIG. 5
FIG. 1
INVENTOR.
HOWARD S. HERSHEY JR.
BY Otto Moeller

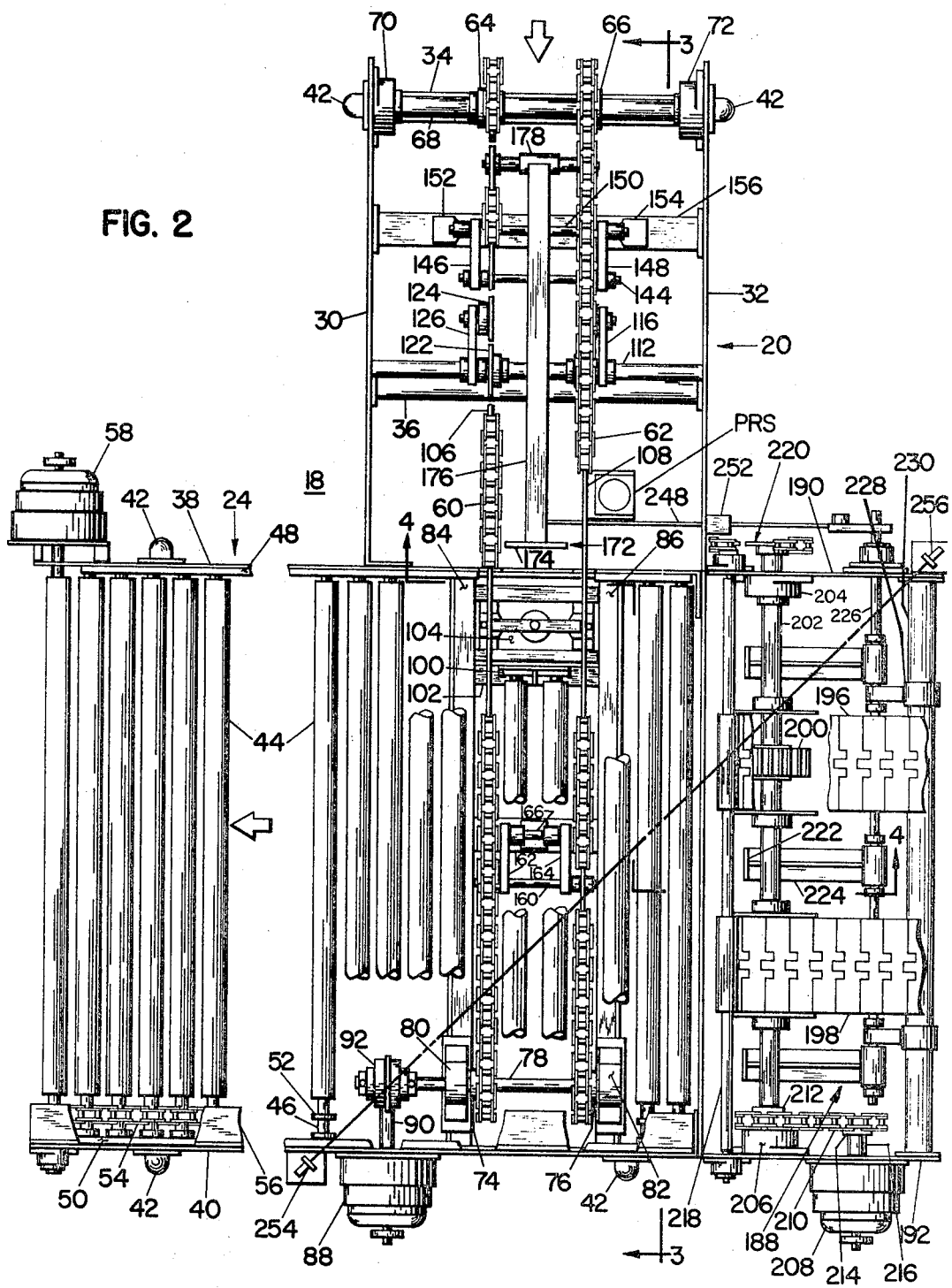

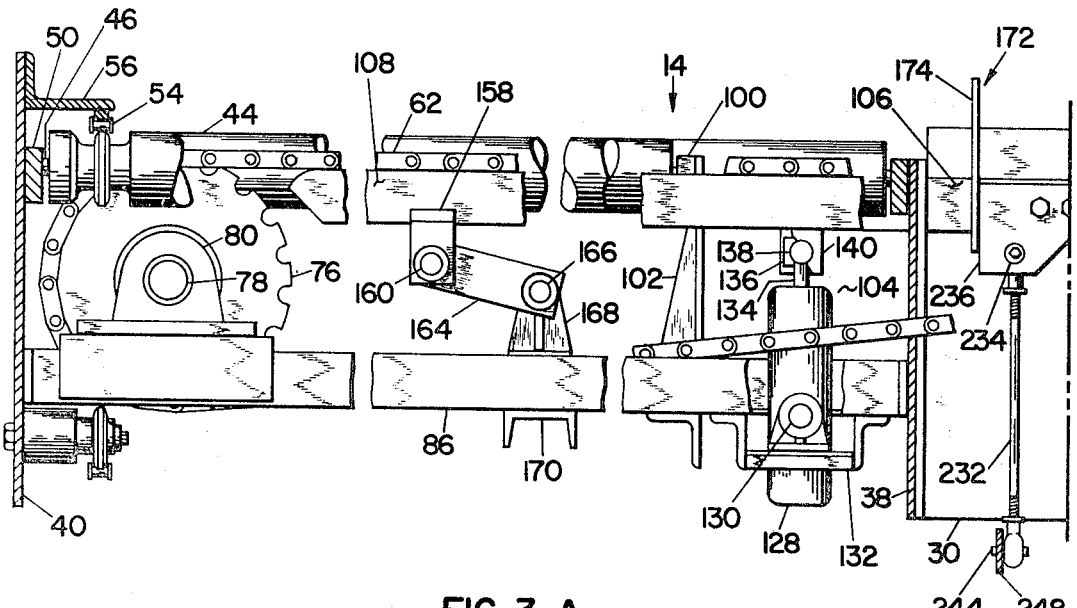
FIG. 3-A
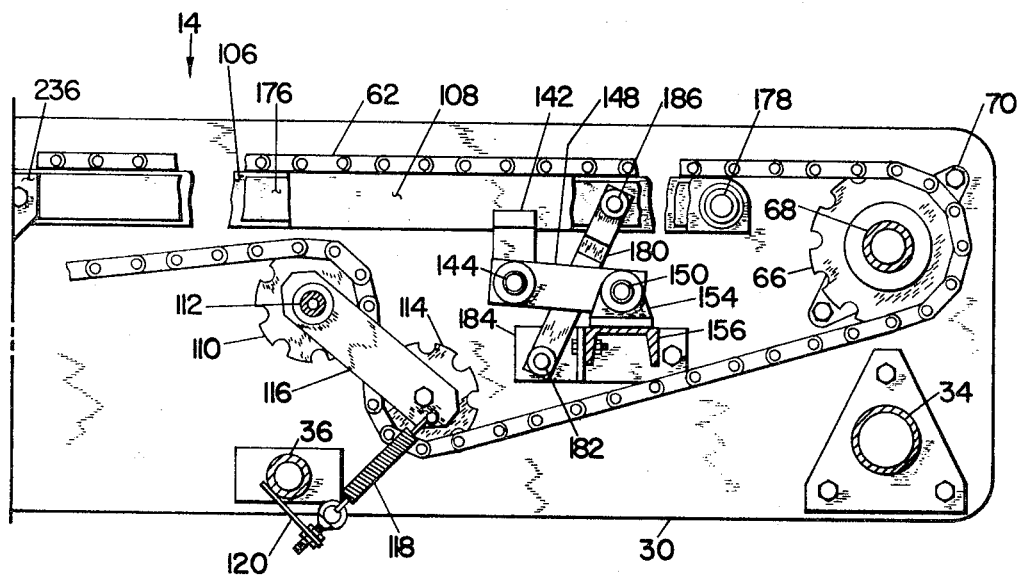
FIG. 3-B
INVENTOR.
HOWARD S. HERSHEY JR.
BY Otto Moeller

United States Patent Office 3,519,119
Patented July 7, 1970

3,519,119
PAN TRANSFER CONVEYOR INTERSECTION
Howard S. Hershey, Jr., Brodbecks, Pa., assignor, by mesne assignments, to Teledyne, Inc., Los Angeles, Calif., a corporation of Delaware
Filed Mar. 5, 1968, Ser. No. 710,486
Int. Cl. B65g 47/26
U.S. Cl. 198—21                                  5 Claims

ABSTRACT OF THE DISCLOSURE

An intersection conveying system including a main continuously traveling conveyor along which articles delivered thereto from a first preliminary processing station are conveyed in spaced relation to a subsequent processing station, and an intersecting article transfer apparatus including a continuously traveling conveyor intersecting and lying athwart the main conveyor adapted to receive articles from a second preliminary processing station for conveyance onto said main conveyor in the spaces between articles on said main conveyor. The apparatus includes a pair of mechanically linked article controlled escapement gate means associated one with said main conveyor and the other with said intersecting conveyor disposed respectively adjacent said intersection and arranged when either of said gates is in article intercepting position the other of said gates is in article releasing position. The gate and control means are arranged to provide an optimum flow of articles into the intersection even though the articles advancing toward the intersection are not uniformly spaced, and so that an article on the main conveyor closely approaching the intersection will be intercepted by the gate assocfated with the main conveyor when an article is released by the gate associated with the intersecting conveyor for a sufficient length of time to permit insertion of the article released by the intersecting conveyor gate, whereby a collision of the articles is prevented without operation of the intersecting conveyor at an excessively high rate of speed.

BACKGROUND OF THE INVENTION

In automated commercial bakeries, in the mass production for example of hamburger, frankfurter and other types of buns, the dough pieces are molded and automatically deposited in pans at what is commonly referred to as a make-up station. Such bun pans are rectangular in shape and the bottoms are provided with a plurality of shallow depressions arranged in transversely and longitudinally spaced rows. The pans are moved through the make-up station on a continuously traveling feed conveyor, being arrested thereon by well known gating means to permit the dough pieces to be deposited in the bun pan depressions and then released. The feeder conveyor delivers the now spaced pans onto a continuously traveling main conveyor for conveyance to a conventional proofer in which under controlled conditions of temperature and humidity the dough pieces are proofed, ready for baking. Such proofers have a capacity for handling a greater number of pans of dough than can be delivered from one make-up station, and the present invention relates to a pan conveyor transfer intersection including a continuously traveling intersecting conveyor whereby pans of dough delivered thereto from the feed conveyor of a second make-up station are transferred onto the continuously traveling main conveyor in the spaces between the pans being conveyed through the intersection so that twice was many pans of dough can be delivered by the main conveyor to the proofer per unit of time. In a conveying system of the type described, since pans of dough are being continuously moved through the intersection in spaced relation on the continuously traveling main conveyor, it is essential that pans of dough be delivered by the intersecting conveyor onto the main conveyor in the spaces between successive pans passing through the intersection without causing collision of the pans, and to this end escapement gate means has been associated with the intersecting conveyor with control means responsive to the location of pans on the main conveyor for releasing a pan from the intersecting conveyor at an appropriate time for insertion into the spaces between pans passing through the intersection on the continuously traveling main conveyor.

SUMMARY OF THE INVENTION

In a conveying system as and for the purpose described above, without more, in order to avoid a collision of pans at the intersection, the control means must be arranged to maintain the intersecting conveyor gate in pan intercepting position until a main conveyor pan has cleared the intersection and a following pan is a distance upstream of the intersection to permit the pan on the intersecting conveyor to be deposited on the main conveyor prior to arrival of the said following pan at the intersection. In apparatus of the type described it is virtually impossible to uniformly maintain such a distance between pans, so that if a following pan arrived at the control means just prior to clearance of the control means by the preceding pan, the intersecting conveyor gate would not operate to release the pan on the intersecting conveyor. Thus the two main conveyor pans, with a considerable space therebetween, would pass through the intersection without a pan from the intersecting conveyor being inserted in such space, thereby materially reducing the flow capacity of pans to the proofer by the conveying system.

It is an object of the invention to provide in apparatus of the type described a novel gating and control arrangement providing an optimum capacity of flow of pans by the main and intersecting conveyors by permitting insertion of pans from the intersecting conveyor into the spaces between pans on the main conveyor with substantially greater tolerance in such pan spacing. This is accomplished by providing a gate for the main conveyor in near adjacency to the upstream end of the intersection, mechanically linked with the intersecting conveyor gate to move to pan intercepting position when the intersecting conveyor gate moves to pan releasing position; and disposing the control means so that a pan may be released by the intersecting conveyor gate even though a pan on the main conveyor approaching the intersection would normally collide with the pan released by the intersecting conveyor gate. Since the main conveyor gate is now in position to intercept and hold the pan on the main conveyor just upstream of the intersection until the pan released by the intersecting conveyor gate has been deposited on the main conveyor, collision of the pans is avoided. With the intersecting conveyor pan now deposited on the main conveyor, the control means is arranged to effect return of the intersecting conveyor gate to pan intercepting position, thereby movnig the main conveyor gate to pan releasing position, whereupon the two pans will now proceed together down the main conveyor.

In the above illustration, in the absence of the described main conveyor gate for intercepting the pan approaching the intersection, it is essential in order to avoid a collision of pans to operate the intersecting conveyor at an excessively higher rate of speed than the main conveyor to insure arrival of the pan released by the intersecting gate wholly in the intersection prior to arrival of the main conveyor pan in the path of the intersecting conveyor pan. With the main conveyor gate arranged to intercept the main conveyor pan, the intersecting conveyor can be operated at a considerably slower speed without causing a collision of pans at the intersection. This is important, particularly in the handling of conventional low bun pans, since the impact of pans against the intersecting conveyor gate at high intersecting conveyor speeds, cause the dough pieces to slide out of the shallow bun pan depressions and to become undesirably dislocated or misshapen.

Other objects and advantages of the invention will be hereinafter pointed out or will become apparent from the following description when read in conjunction with the accompanying drawings.

BRIEF DESCRIPTION OF THE DRAWINGS

FIG. 1 is a somewhat diagrammatic view in plan of the pan intersection transfer apparatus for transferring pans from one processing station to a main conveyor along which pans received from another processing station are being continuously advanced in spaced relation toward the intersection;

FIG. 2 is an enlarged detailed plan view of the pan intersection transfer apparatus of FIG. 1;

FIGS. 3A and 3B are sectional views taken on broken line 3—3 of FIG. 2;

FIG. 4 is a sectional view taken on line 4—4 of FIG. 2; and

FIG. 5 is a schematic view of an electrical control system for the apparatus.

DESCRIPTION OF THE PREFERRED EMBODIMENT

Referring to FIG. 1, the invention is more or less diagrammatically illustrated as incorporated in a conveying system for delivering pans P of dough to a processing station, as for example to a proofer, not shown, for proofing the dough.

The conveying system includes a main conveyor line 10 for conveying pans P in the direction of the arrow 12 to the proofer. Disposed at right angles to and intersecting the main conveyor line 10 is a pan feed line 14 for conveying dough containing pans P in the direction of the arrow 16 onto the main conveyor line 10 from a conventional make up station, not shown, where the dough pieces are formed and placed in the pans by means and in a manner well known in the baking industry.

Because of the time consumed at the forming and panning station, the pans are delivered therefrom in substantial spaced relation and at a rate considerably less than the capacity of the proofer. To provide a more efficient operation and an increased production rate afforded by the capacity of the proofer, pans of dough are delivered from an additional make up station, not shown, to the upstream end of the main conveyor line 10, upstream of the pan feed line 14, with pans from the feed line 14 being delivered onto the main conveyor line 10 in the spaces between the pans advancing along the main conveyor line 10 past the pan feed line 14.

The intersecting pan feed line 14 of the conveying system includes a right angle pan transfer unit 18 constructed and arranged for controlled delivery of pans from feed line 14 to the main conveyor line 10 whereby such pans are inserted into the spaces between the pans advancing along the main conveyor line 10 past the feed line 14.

The pan transfer unit 18 includes an inlet conveyor 20 at the upstream end of feed conevying line 14 to which successive pans of dough are delivered from the make up and panning station by any suitable type of conventional conveyor 22 at the downstream end of pan feed line 14. The pan transfer unit 18 also includes an outlet conveyor 24 lying athwart the downstream end of inlet conveyor 20 for receiving successive pans of dough therefrom; the outlet conveyor 24 in effect forming a section of the main conveyor line 10. The main conveyor line 10 includes a conveyor section 26 of any suitable conventional construction upstream of conveyor section 24, to which pans of dough are delivered in spaced relation from another make up and panning station, as previously explained, and also includes a conveyor section 28 of any suitable conventional construction downstream of conveyor section 24 leading therefrom to the proofer.

Referring particularly to FIG. 2, the inlet conveyor 20 of the pan transfer unit 18 includes parallel, laterally spaced supporting frame members 30 and 32 connected by suitable end and intermediate spacer members 34 and 36, and the outlet conveyor 24 includes parallel, laterally spaced supporting frame members 38 and 40 connected by suitable spacer members, not shown. Fittings 42 secured to the various frame members are adapted to receive legs, not shown, for supporting the pan transfer unit 18 a desired distance above the floor.

The outlet conveyor 24 is preferably in the form of a powered roll conveyor including a plurality of transversely extending longitudinally spaced rolls 44 having reduced end portions 46 journaled in longitudinally extending roll mounts 48 and 50 secured respectively to side frame members 38 and 40. The reduced roll end portions 46 adjacent the roll mount 50 have sprockets 52 keyed thereon around which is trained an endless drive chain 54. A longitudinally extending hold down angle member 56 rigidly secured in suitable manner to the inner side of the frame member 40 projects inwardly therefrom in overlying relation to the top run of the chain 54 to maintain the latter in driving relation with the roll sprockets 52. Suitable drive means 58 supported by side frame member 38 and operatively connected with the end one of the rolls 44 drives all the rolls through the endless drive chain 54 and sprockets 52.

The inlet conveyor 20 includes a pair of longitudinally extending laterally spaced endless chain conveyors 60 and 62 trained over sprockets 64 and 66 fixed on a transversely extending shaft 68 rotatably mounted in bearings 70 and 72 carried by the side frame members 30 and 32 of the inlet conveyor 20 at the upstream end thereof; and trained over sprocket 74 and 76 fixed on a transversely extending shaft 78 rotatably mounted in bearings 80 and 82 supported adjacent the side frame member 40 of the outlet conveyor 24 on struts 84 and 86 extending between side frame members 38 and 40. The chain conveyors 60 and 62 are continuously driven from a motor and gear reduction unit 88 suitably mounted on the frame member 40, the output shaft 90 of which is connected with an extension of shaft 78 by gearing 92. As best shown in FIG. 4, the roll mount 48 is cut away at 94 and the side frame member 38 is recessed at 96 and 98 to permit the chain conveyors 60 and 62 to pass freely therethrough. Certain of the rolls 44 are spaced a sufficient distance apart, as best shown in FIG. 2, to freely accommodate the upper runs of the chain conveyors 60 and 62 therebetween. The two rolls 44 disposed between the chain conveyors 60 and 62 terminate at one end short of the other rolls 44 and are journaled in a roll mount 100 supported by a bracket 102 secured at its ends to the struts 84 and 86 providing a space 104 between the roll mount 100 and the plane of the roll mount 48 for a purpose to be described later. The above described means for mounting the chain conveyors 60 and 62 are arranged so that the upper chain conveyor runs are normally disposed in a horizontal plane slightly below the horizontal plane of the supporting surface of the rolls 44.

In order to transfer a pan from the inlet conveyor 20 to the outlet conveyor 24, a pair of longitudinally extending lift rails 106 and 108 are disposed respectively in underlying engagement with the upper run of respective chain conveyors 60 and 62 of the inlet conveyor 20. As best shown in FIGS. 3A, 3B, the chain lift rail 108 terminates at its ends just short of the sprockets 66 and 76 over which the chain conveyor 62 is trained, it being understood that chain lift rail 106 is similarly disposed with respect to sprockets 64 and 74. Means, hereinafter described in detail, is provided for periodically raising the chain lift rails 106 and 108 to elevate the top runs of the chain conveyors 60 and 62 from their previously described normal position slightly below the plane of the pan supporting surface of the rolls 44 to a position slightly above such plane whereby a pan is advanced by the chain conveyors 60 and 62 to a position above the rolls 44; and for periodically lowering the chain lift rails 106 and 108 to permit return of the upper runs of the chain conveyors 60 and 62 from their elevated position to their normal lowered position to deposit the pan on the rolls 44 for conveyance thereby.

To permit the upper runs of the chain conveyors 60 and 62 to be raised and lowered, above and below the plane of the pan supporting surface of the rolls 44, the lower runs thereof are provided with yieldable chain tensioning means. Referring particularly to FIGS. 3A, 3B, the lower run of chain conveyor 62 is trained over a sprocket 110 rotatably mounted on a transversely extending shaft 112 secured at its ends to side frame members 30 and 32, and also trained under a downwardly and rearwardly offset sprocket 114 rotatably supported at one end of a lever 116, the other end of which lever 116 is rotatably supported on the shaft 112. A coil spring 118 is attached at one end to the free end of the lever 116 and at its other end is attached to a downwardly and forwardly offset adjustable spring tension mounting 120 secured to the intermediate spacer member 36 connecting the side frame members 30 and 32 of the inlet conveyor 32. When the upper run of the chain conveyor 62 is elevated upon the raising of the chain lift rail 108, it will be seen that the sprocket 114 is bodily swingable in a counterclockwise direction, as viewed in FIG. 3B, about the axis of the sprocket 110 against the tension of spring 118 to provide the necessary additional length of chain in the upper run. The weight of the sprocket 114 in addition to the tension of spring 118 takes up the slack in the upper run of chain 62 upon lowering of the chain lift rail 108, so that it returns to its normal lowered position. A similar arrangement is provided for the chain conveyor 60, there being shown in FIG. 4, a sprocket 122 corresponding to sprocket 110, a sprocket 124 corresponding to sprocket 114 and a lever 126 corresponding to lever 116.

The means for raising and lowering the chain lift rails 106 and 108 includes an air cylinder 128 disposed below the chain lift rails 106 and 108 midway therebetween in the previously referred to space 104. The cylinder 128 is mounted near its lower end for pivotal movement about a transversely extending axis, as best shown at 130 in FIG. 3A, the pivotal mounting being supported on a bracket 132 rigidly fixed to and spanning the struts 84 and 86. The free end of the cylinder piston stem 134 is secured to a lift bar 136 provided at its ends with pins 138 rotatably mounted in lugs 140 rigidly secured, as by welding, to the under side of the chain lift rails 106 and 108.

In order to restrain forward movement of the chain lift rails 106 and 108 and yet permit raising thereof by the air cylinder 128 to elevate the chain conveyors 60 and 62 slightly above the level of the rolls 44, as previously described, and referring specifically to rail 108, it is provided near its rearward or upstream end with a depending lug 142, FIG. 3B. Extending through the lug 142 and a similar lug depending from rail 106 is a transversely extending shaft 144 on the ends of which are pivotally mounted one end of links 146 and 148. The other ends of links 146 and 148 are pivotally mounted on a transversely extending shaft 150 rotatably mounted in bearings 152 and 154 offset rearwardly of and slightly below the mounting of the first mentioned end of links 146 and 148, the bearings 152 and 154 being supported on a channel member 156 secured at its ends to frame members 30 and 32. A similar mounting is provided for the rails 106 and 108 near their forward or downstream ends, each having a depending lug secured thereto, the lug 158 for the rail 108 being shown in FIG. 3A. Extending through the lug 158 of rail 108 and the similar lug of rail 106, is a transversely extending shaft 160 on which, inwardly of the rail lugs, are pivotally mounted one end of links 162 and 164. The other ends of links 162 and 164 are pivotally mounted on opposite ends of a transversely extending shaft 166, rotatably mounted in a bearing 168 offset rearwardly of and sightly below the mounting of the first mentioned end of links 162 and 164, the bearing 168 being supported on a channel member 170 secured at its ends of the struts 84 and 86.

Associated with the pan advancing chain conveyors 60 and 62 is an escapement means 172 for releasing pans to be transferred to the roll bed outlet conveyor 24 one at a time. The escapement means 172 includes a gate 174 disposed between the chain conveyors 60 and 62 a short distance rearward of the plane of the frame member 32. The gate 174 is arranged, when the upper runs of chain conveyors 60 and 62 are in their normal lowered position, to be disposed in the path of and intercept a pan being conveyed by the chain conveyors 60 and 62; and is arranged, when the upper runs of chain conveyors 60 and 62 are elevated upon raising of the rails 106 and 108 by the air cylinder 128 as previously described, to be disposed below such path to permit the pan to pass to a position over the roll bed conveyor 24.

The gate 174 is rigidly secured, in any suitable manner, to and projects upwardly from the forward end of a longitudinally extending gate support arm 176. The rearward end of the gate support arm 176 is rigidly secured to a transversely extending trunnion 178, at best shown in FIGS. 2 and 3B, the ends of which are rotatably mounted in the rearward ends of the chain lift rails 106 and 108. The gate support arm 176 is normally retained in its horizontal position, as shown in FIGS. 3A and 3B, by a pivot support link 180, the lower bifurcated end of which is pivotally connected at 182 to opposite sides of a bracket 184 rigidly secured to the stationary channel member 156, and the upper bifurcated end of which is pivotally connected at 186 to opposite sides of the gate support arm 176.

When the chain lift rails 106 and 108 are now raised by the air cylinder 128, as previously described, the gate arm 176 swings about pivotal connection 186 as a fulcrum from its normal horizontal position, as shown in the drawings, to a downwardly and forwardly sloping position, raising its rearward end which, as above described, is pivotally connected with the rearward end of the chain lift rails 106 and 108, and lowering its gate supporting forward end. Since the pivotal connection 186 or fulcrum is, as shown, considerably closer to the rearward end of gate support arm 176 than to the forward end thereof, it is evident that a small upward movement of the rearward end of the gate support arm 176 by the chain lift rails 106 and 108 effects a considerably greater downward movement of the forward end of the gate support arm 176, sufficient to lower the gate 174 below the conveying surface of the chain conveyors 60 and 62 to thereby release a previously restrained pan.

Operating in conjunction with the escapement means 172 is an escapement means 188 disposed at the downstream end of the conveyor section 26 of the main conveying line 10 closely adjacent the roll bed conveyor 24. The conveyor section 26 includes laterally spaced frame members 190 and 192 in linear alignment with the frame members 38 and 40 of the roll bed conveyor 24, the frame members 190 and 192 being connected by suitable spacer members, one of which is shown at 194 in FIG. 2. The conveying means of the conveyor section 26 may be of any suitable type, preferably in the form of a pair of endless table top conveyors 196 and 198 disposed between side frame members 190 and 192 in parallel spaced relation therewith and in parallel spaced relation with respect to each other. At their downstream ends the conveyors 196 and 198 are trained around sprockets, the sprocket for conveyor 196 being identified in FIG. 2 by reference numeral 200, mounted on a shaft 202 disposed as close as practicable to roll bed conveyor 24. Shaft 202 is suitably journaled at its ends in bearings 204 and 206 supported on side frame members 190 and 192. The upstream ends, not shown, of the conveyors 196 and 198 it will be understood may be provided with a similar shaft and sprocket arrangement. The conveyors 196 and 198 are continuously driven from a motor and gear reduction unit 208 suitably mounted on the frame member 192, through a sprocket chain 210 trained over sprockets 212 and 214 secured respectively on shaft 202 and output shaft 216 of motor and gear reduction unit 208.

In order to facilitate movement of pans from the conveyors 196 and 198 to the roll bed conveyor 24, an auxiliary power operated roll 218 is preferably disposed in the gap therebetween and is rotatably supported at its ends in suitable bearings carried by the plate members 190 and 192. The auxiliary roll 218 is operatively connected to the shaft 202 by sprocket and sprocket chain means indicated as a whole in FIG. 2 by the reference numeral 220.

The escapement means 188 includes pan intercepting fingers or gates 222 disposed between the conveyors 196 and 198, and between the conveyors 196 and 198 and side frame members 190 and 192 which, as hereinafter described, are movable between a raised position shown in phantom in FIG. 2, wherein they are disposed in the path of pans on conveyors 196 and 198 to intercept the same, and a lowered position below such path shown in full lines in FIG. 2, whereby to permit pans to pass to the roll bed conveyor 24. The gates 222 are located as near as practicable to the roll bed conveyor 24, such that the distance a pan released by the gates 222 must travel to reach the roll bed conveyor 24 is very substantially shorter than the distance a pan released by the gate 174 must travel in depositing it onto the roll bed conveyor 24. The significance of this will be hereinafter described in detail. The gates 222 are arranged to be moved between raised and lowered position by means of the gate lever arms 224 rigidly secured to a transversely extending rock shaft 226, the rock shaft 226 being rotatably mounted in bearing supports 228 rigidly secured to a transversely extending tubular member 230 secured at its ends to plate members 190 and 192.

By means now to be described, the escapment means 188 is operatively connected with the escapement means 172, to raise the gates 222 when the gate 174 is lowered and to lower the gates 222 when the gate 174 is raised. For this purpose a vertically extending lever rod 232 is pivotally mounted at its upper end on a pin 234 carried by support members 236 secured to and depending from opposite sides of the forward end of gate support arm 176. A second vertically extending lever rod 238 has a pivotal connection 240 at its upper end with the forward end of a rocker arm 242, the rearward end of rocker arm 242 being rigidly secured to rock shaft 226. The lower ends of lever rods 232 and 238 are pivotally connected at 244 and 246 to opposite ends of a lever 248 which is pivotally supported at 250 in the bifurcated layer end of a support member 252 rigidly secured to and depending from frame member 32.

The control means for operating the cylinder 128 to raise and lower the chain lift rails 106 and 108 with consequent lowering and raising of the gate 174, for release and insertion of pans at the proper time from feeder line 14 into the spaces between the pans being conveyed along main conveying line 10, will now be described in detail.

A proximity sensor PRS is disposed a short distance upstream of the gate 174 in position for engagement by a pan conveyed by the chain conveyors 60 and 62 of the inlet conveyor 20. The distance is such as to provide sufficient time for the gate 174 to be raised from its lowered to its raised position in the path of the pan when, under certain conditions as hereinafter described, the gate 174 responds to engagement of the pan with the proximity sensor PRS.

The control means also includes a photoelectric control device including a source of light 254 and a photoelectric cell 256 disposed at opposite sides of the outlet conveyor 24 of the transfer unit 18 in longitudinally offset relation for directing a light beam 258 diagonally thereacross in the path of the pans conveyed along main conveying line 10. The light source 254 and photoelectric cell 256 are located, as may best be seen by referring to FIG. 1, so that the light beam 258 will be broken by the leading edge of a pan advancing along main conveyor line 10 a relatively short distance upstream of the path followed by a pan when transferred from the feeder line 14 to the main conveyor line 10 and will remain broken until the trailing edge of the first mentioned pan has just passed the said path. For reasons that will become apparent, the photoelectric cell 256 is furthermore so disposed that the light beam will be broken by pan P–1 prior to its arrival at the gates 222 but at a distance from the path of a pan P–2 released by gate 174 substantially less than the distance the released pan P–2 must travel to be disposed wholly over the roll bed conveyor 24.

The control system, referring particularly to the wiring diagram FIG. 5, includes a normally open contact CRE of a relay of the previously described photoelectric eye assembly which is closed when the beam 258 is uninterrupted, and includes an electric valve EV which when energized effects operation of the cylinder 128 to raise the lift rails 106 and 108, hence raising chain conveyors 60 and 62 and lowering the gate 174, as previously described.

Assume now that pan P–1 is in position about to break but has not broken the beam 258 when pan P–2 engages the proximity sensor PRS. In this situation, contact CRE will be closed and contact C1 of proximity sensor PRS will be closed, thereby completing a circuit through line acd to and energizing electric valve EV to effect lowering of the gate 174 and elevation of the chain conveyors 60 and 62, whereby to release pan P–2 for conveyance over the roll bed conveyor 24.

Referring to FIG. 5 it will be seen that when line acd to the electric valve EV was completed, line ab was simultaneously completed to energize control relay CRA. Energization of control relay CRA closes its contacts CRA–C1 and CRA–C2. With contact CRA–C2 closed and with a second contact C2 of proximity sensor PRS now also closed, time delay relay TDR in line e is energized. Energization of time delay relay TDR immediately closes time delay contact TD–C, thereby completing a circuit through line fcb to and holding control relay CRA energized even though the beam 258 is broken by the leading edge of advancing pan P–1 or by the chain conveyors 60 and 62 causing the contact CRE of the photoelectric eye assembly relay to re-open. The cylinder controlling electric valve EV thus remains energized through line fd so that the chain conveyors 60 and 62 remain in their raised position and the gate 174 remains in its lowered position. Gates 222 will now, through the means previously described, be in their raised position to stop pan P–2 closely adjacent the path of pan P–1 which is advancing toward the roll bed conveyor 24. The off time delay TD is arranged to permit pans P regardless of length, to be advanced wholly over the rollers 44 of the roll bed conveyor 24 in a position to be deposited thereon with their trailing edges a uniform distance from the gate 174. The time delay for which the off time delay TD is set starts when the trailing edge of a pan P leaves the proximity sensor PRS, thereby opening its contact PR–C2 and de-energizing time delay relay TDR. When the set time for moving a pan as aforesaid elapses, the time delay contact TD–C opens whereupon line fd to the cylinder controlling valve EV is broken to effect lowering of the lift rails 106 and 108 by the cylinder 128, and thereby lowering the chain conveyors 60 and 62 to deposit the pan P–2 on the rollers 44 and to raise the gate 74 with consequent lowering of the gates 222 and release of pan P-1.

The restraining of pan P-1 by the gates 222 thus prevents collision between a pan P-1 and a pan P-2 and at the same time permits a pan P-1 to be released directly behind a deposited pan P-2 for conveyance together along main line 10. In the situation described above if a pan P-1 is about to break the beam 158 when a pan P-2 is released by lowering a gate 174, collision of such pans in the absence of gates 222, can be avoided by operating the chain conveyors 60 and 62 at a speed twice or more as fast as the pan conveyors 196 and 198 to insure depositing of a pan P-2 on roll bed conveyor 24 ahead of a pan P-1. At such speeds of the chain conveyors 60 and 62, the impact of pans P-2 against the gate 174 is undesirably excessive. This is particularly important in the handling of conventional low bun pans having shallow depressions in which dough pieces have been deposited for making various types of buns, such as hamburger or frankfurter buns, since too abrupt a stop of such pans causes the dough pieces to slide out of the pan depressions and become undesirably oriented or misshapen. However, in the present construction the gates 222 intercept the pan P-1, and since the gates 222 can not be lowered to release the pan P-1 until the pan P-2 has been advanced wholly over and deposited on the roll bed conveyor 24, the chain conveyors 60 and 62 can be operated at a sufficiently low rate of speed to prevent the aforesaid undesirable impact of pans P-2 against the gate 174.

From the preceding description it is clear that gate 174 can be lowered to release a pan P-2 only when the beam 258 is uninterrupted. Consequently, in the absence of the gates 222, in order to prevent collision of a pan P-1 with a pan P-2 without operating chain conveyors 60 and 62 at an excessive rate of speed, it is necessary to relocate the photoelectric cell 256 so that the point at which the beam 258 is broken by the leading edge of a pan P-1 is a very substantial distance upstream of that shown in FIG. 1. The nature of apparatus of the type described above is such that pans will not be consistently evenly spaced, so that if now two pans P-1 in the above illustration are spaced so that one pan P-1 breaks the beam 258 just before a preceding pan P-1 clears the beam, a pan P-2 will not be released to enter the space between the two P-1 pans. In the present arrangement, with the same P-1 pan spacing as above, the beam 258 will remain unbroken for a sufficient length of time to permit release of a pan P-2 to enter the space between the two P-1 pans. In this case the second of the two P-1 pans will be held up by the gates 222 to permit complete entry of pan P-2 into the said space, and as previously explained, as soon as pan P-2 has completely entered this space, the gates 222 move to their lowered position releasing pan P-1 to follow closely pan P-2 in their travel along main conveyor line 10. An optimum capacity flow of pans to the proofer is thus insured even though the pans advancing toward the intersection are haphazardly spaced.

While the invention has been described with particular reference to the conveyance of dough pans, it should be understood that it is equally applicable to conveyance of other articles where it is desired to insert articles from one source into spaces between articles from another source.

I claim:

1. In a pan conveyor intersection, the combination of a continuously operating main conveyor along which a first row of spaced pans are adapted to be conveyed;
   a continuously operating intersecting conveyor for delivering a second row of pans onto said main conveyor in the spaces between said first row of pans;
   first gate means associated with said intersecting conveyor disposed adjacent one side of said main conveyor and supported for movement into and out of the path of pans advanced by said intersecting conveyor for respectively arresting a pan on said intersecting conveyor and releasing a pan for delivery thereby onto said main conveyor;
   operating means for said first gate means;
   control means for said operating means including first sensing means adjacent said first gate means responsive to engagement therewith of an intersecting conveyor pan for enabling said control means to effect movement of said first gate means by said operating means to pan releasing position;
   said control means including second sensing means associated with said main conveyor responsive to engagement of a main conveyor pan therewith at a given point located at a given distance upstream of said intersection for rendering said control means ineffective to move said first gate means by said operating means to pan releasing position;
   said given distance being such that a main conveyor pan prior to engagement with said second sensing means would at the relative speeds of said main and intersecting conveyors collide with a pan released by said first gate means; and
   second gate means associated with said main conveyor disposed between said intersection and said given point; and linkage means connecting said second gate means with said first gate means for movement to pan arresting position when said first gate means moves to pan releasing position to arrest said main conveyor pan closely adjacent the upstream end of said intersection.

2. A pan intersection conveyor in accordance with claim 1 wherein said control means is responsive to disenagement of said intersecting conveyor pan with said first sensing means and advancement thereof to a position on said main conveyor for movement of said first gate means by said operating means to pan arresting position.

3. A pan intersection conveyor in accordance with claim 1 wherein said second sensing means is arranged upon being engaged at said given point by said main conveyor pan, to remain engaged by said main conveyor pan until said main conveyor pan clears said intersection to maintain said control means ineffective to move said first gate means by said operating means to pan releasing position until said main conveyor pan clears said intersection.

4. In a pan conveyor intersection, the combination of a continuously operating main conveyor along which a first row of spaced pans are adapted to be conveyed;
   a continuously operating intersecting conveyor for delivering pans of a second row onto said main conveyor in the spaces between said first row of pans;
   first gate means associated with said intersecting conveyor disposed adjacent one side of said main conveyor and supported for movement into and out of the path of pans advanced by said intersecting conveyor for respectively arresting a pan on said intersecting conveyor and releasing a pan for delivery onto said main conveyor;
   operating means for said first gate means;
   control means for said operating means including sensing means adjacent said first gate means responsive to engagement therewith of an intersecting conveyor pan for enabling said control means to effect movement of said first gate means by said operating means to pan releasing position;
   said control means including means forming a beam of light diagonally crossing said main conveyor at said intersection and photo-electric means responsive to interruption of said beam by a main conveyor pan at a given point located at a given distance upstream of said intersection for rendering said control means ineffective to move said first gate means by said operating means to pan releasing position;

said given distance being such that a main conveyor pan prior to interruption of said beam would at the relative speeds of said main and intersecting conveyors collide with a pan released by said first gate means;

second gate means associated with said main conveyor disposed between said intersection and said given point; and linkage means connecting said second gate means with said first gate means for movement to pan arresting position when said first gate means moves to pan releasing position to arrest said main conveyor pan closely adjacent the upstream end of said intersection.

5. A pan intersection conveyor in accordance with claim 4 wherein said beam is arranged upon being interrupted at said given point by said main conveyor pan, to remain interrupted by said main conveyor pan until said main conveyor pan clears said intersection to maintain said control means ineffective to move said first gate means by said operating means to pan releasing position until said main conveyor pan clears said intersection.

References Cited

UNITED STATES PATENTS

| | | | |
|---|---|---|---|
| 3,064,792 | 11/1962 | Du Broff | 198—32 |
| 3,096,871 | 7/1963 | Anderson | 198—21 X |
| 3,265,186 | 8/1968 | Burton | 198—78 X |

GERALD M. FORLENZA, Primary Examiner

G. F. ABRAHAM, Assistant Examiner

U.S. Cl. X.R.

198—32, 79